April 15, 1958  D. B. PRESCOTT  2,830,621
THERMAL COMPENSATING NEEDLE VALVE
Filed June 10, 1955
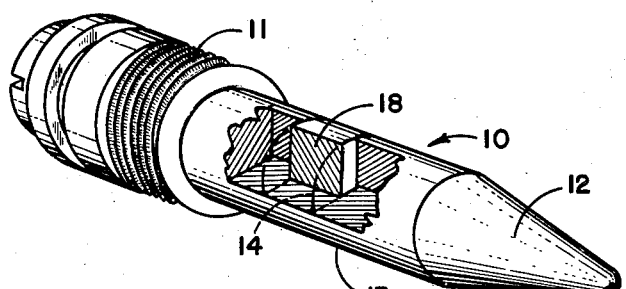
FIG. 1
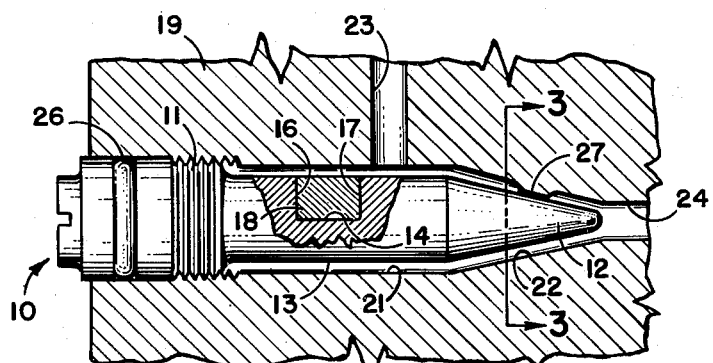 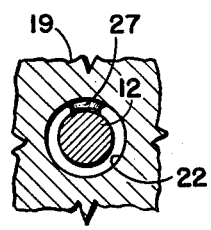
FIG. 2  FIG. 3
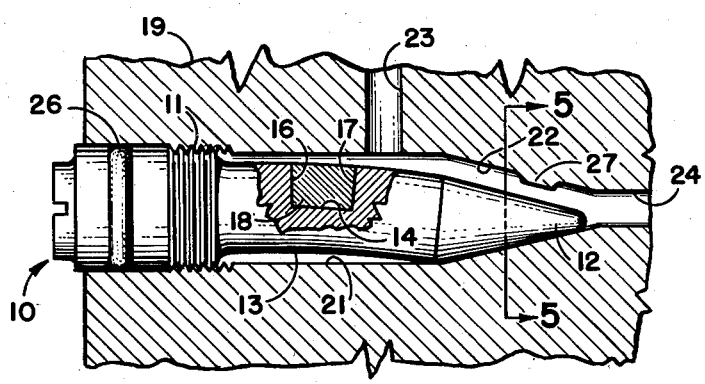 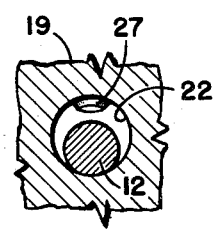
FIG. 4  FIG. 5
*INVENTOR.*
DAVID B. PRESCOTT
BY
*ATTORNEY*

United States Patent Office 2,830,621
Patented Apr. 15, 1958

2,830,621

THERMAL COMPENSATING NEEDLE VALVE

David B. Prescott, Euclid, Ohio, assignor to The Cleveland Pneumatic Tool Company, Cleveland, Ohio, a corporation of Ohio Application June 10, 1955, Serial No. 514,553

5 Claims. (Cl. 138—46)

This invention relates generally to fluid metering devices and more particularly to a new and improved thermal compensated needle valve which automatically compensates for changes in the viscosity of the metered fluid.

It is an important object of this invention to provide a metering device having new and improved means to compensate for viscosity changes of the metered fluid created by changes in the temperature thereof.

It is another important object of this invention to provide a thermal compensated fluid metering device which automatically adjusts the resistance to fluid flow therethrough to compensate for changes in the viscosity of the fluid.

It is still another object of this invention to provide a fluid metering device including an orifice with a member projecting therethrough wherein means are provided to automatically adjust the eccentricity of the member relative to the orifice to compensate for variations in the viscosity of the fluid being metered.

Further objects and advantages will appear from the following description and drawings, wherein:

Figure 1 is a perspective view of the preferred form of needle valve according to this invention;

Figure 2 is a side elevation partially in longitudinal section showing the needle valve installed in the valve body;

Figure 3 is a cross section taken along 3—3 of Figure 2;

Figure 4 is a side elevation partially in longitudinal section similar to Figure 2 showing the temperature compensating action of the needle valve structure; and Figure 5 is a cross section taken along 5—5 of Figure 4.

On many occasions, a metering orifice is utilized to control the flow of fluid in a device wherein it is desirable to provide a constant volume flow for a given pressure drop even though the viscosity of the liquid being metered may change due to changes in the temperature thereof. Such is the case in shock absorbers and other forms of damping mechanisms wherein the resistance to movement of the shock absorber would vary with the temperature of the damping liquid unless means have been provided to automatically compensate for the changes in viscosity of the liquid.

In a metering device according to this invention, an orifice is provided into which a needle valve projects to control the resistance of flow of liquid through the orifice. The capacity of a given orifice with a metering member projecting therethrough varies depending upon the concentricity of the metering member. As the metering member approaches a concentric relationship with the orifice, the resistance to flow increases and as the metering member moves to an eccentric position relative to the orifice, the flow resistance decreases even though the cross section remains constant. The resistance to flow, if the flow is of the laminar or viscous type, is inversely proportional to the square of the eccentricity of the metering member and the resistance to flow for a given orifice with a given metering member is two and one-half times as great when the metering member is concentric with the orifice as resistance to flow is when the metering member is against one side of the metering orifice.

With this brief background, reference should be made to the drawings for a clear understanding of the metering device according to this invention. In Figure 1, a preferred needle valve 10, according to this invention, is shown. The needle valve 10 is provided with a threaded mounting portion 11 adjacent to one end and a conical needle portion 12 at the other end spaced from the mounting portion 11 by a stem portion 13. The stem portion 13 is provided with a transverse groove 14 on one side of the stem axis which provides axially spaced radial walls 16 and 17. Positioned within the transverse groove 14 is a semicircular insert 18 which tightly fits against the radial walls 16 and 17. The needle valve 10 and the insert 18 are formed of dissimilar metals having different coefficients of expansion.

Referring to Figure 2, the needle valve 10 is shown as it would be installed in a valve body 19 which is provided with a first bore 21 adapted to loosely receive the stem 13 of the needle valve 10 and terminating in a coaxial conical portion 22. The valve body 19 is also provided with an inlet passage 23 opening into the bore 21 and an outlet passage 24 in communication with the small end of the conical portion 22. The mounting portion 11 is threaded into the bore 21 and a resilient seal 26 prevents leakage between the needle valve and the body. A stop lug 27 is formed in the conical portion 22 and is proportioned to engage the needle portion 12 when it is concentric with the bore 21. The needle valve is shown in Figure 2 with the needle portion 12 concentric with the conical portion 22 which is the position assumed when the highest resistance to flow is produced. This would be the position of the elements when the temperature of the liquid being metered is high and the viscosity of the liquid is low.

If the liquid cools, the viscosity increases so it is necessary to move the needle portion 12 away from its concentric position toward the eccentric position shown in Figures 4 and 5 so that the resistance to flow of the needle valve will be reduced and a constant flow for a given pressure differential will be maintained. Since the stem portion is surrounded by the metered liquid, the stem 13 and insert 18 will be at the same temperature as the liquid. By choosing a metal for the insert 18 with a coefficient of expansion less than the coefficient of expansion of the metal used to form the needle valve 10, it is possible to achieve an automatic deflection of the needle portion 12 toward the eccentric position as the temperature decreases. If the parts are arranged so that the stem portion 13 is straight when the needle valve is at a temperature at the high side of the compensated temperature range, cooling will create a shrinkage of the metal of the stem 13 which is greater than the shrinkage of the metal of the insert 18 for a given amount of cooling. This will cause an increased pressure between the insert 18 and the radial walls 16 and 17 which will cause the stem portion 13 to bend (as shown in Figure 4). This moves the needle portion 12 from the concentric position toward the eccentric position with the amount of eccentricity a function of the amount of cooling.

By properly choosing the proportions and the materials utilized to form the insert 18 and the stem portion 13 for a given liquid, it is possible to produce a compensated metering device which will allow essentially constant volume flow for a given pressure drop through relatively wide variations in temperature. Because there are no sliding parts or wearing surfaces in a metering device according to this invention, the device requires essentially no maintenance or inspection and will give a long trouble-free service life.

In the above detailed description and in the drawings shown, my invention is applied to a needle valve used to correct the changes in viscosity. However, other forms of metering devices provided with a metering orifice and metering member projecting therethrough may be utilized for use in all applications where temperature compensation is desired to maintain or change a flow rate.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A thermal compensating fluid metering device comprising a housing formed with inlet and outlet passages connected by a conical metering orifice, a valve member mounted in said housing formed with a conical metering portion extending into said orifice, the mounting of said valve member positioning said metering portion concentric with said orifice when the fluid is at one temperature, a stop lug in said orifice engaged by said metering portion when in said concentric position, and means automatically moving said metering portion laterally away from said concentric position upon fluid temperature changes from said one temperature.

2. A thermal compensating fluid metering device comprising a housing formed with inlet and outlet passages connected by a metering orifice, a valve member mounted in said housing at a point spaced from said orifice formed with a metering portion extending into said orifice, an insert within said valve formed of a material having a co-efficient of expansion different from that of said valve whereby said metering portion approaches concentricity with said orifice as the fluid reaches a predetermined temperature and moves laterally away from said concentric position as said temperature changes.

3. A thermal compensating fluid metering device comprising a housing formed with inlet and outlet passages connected by a metering orifice, a valve member mounted in said housing at a point spaced from said orifice formed with a stem portion having a coefficient of expansion and a metering portion extending into said orifice, said stem portion being formed with a transverse groove providing axially spaced radial walls, and an insert element in said groove engaging said radial walls formed of a material having a coefficient of expansion different than the coefficient of expansion of said stem whereby said metering portion approached concentricity with said orifice as the stem and element reach a predetermined temperature and move away from said concentric position as said temperature decreases.

4. A thermal compensating fluid metering device comprising a housing formed with inlet and outlet passages connected by a metering orifice, a valve member mounted in said housing at a point spaced from said orifice formed with a stem portion having a coefficient of expansion and a metering portion extending into said orifice, said stem portion being formed with a transverse groove on one side of the axis thereof providing axially spaced radial walls, and an insert element in said groove engaging said radial walls formed of a material having a coefficient of expansion smaller than the coefficient of expansion of said stem whereby said metering portion approaches concentricity with said orifice as the fluid reaches a predetermined temperature and moves away from said concentric position as said temperature decreases.

5. A thermal compensating fluid metering device comprising a housing formed with inlet and outlet passages connected by a metering orifice, a valve member mounted in said housing at a point spaced from said orifice formed with a stem portion having a coefficient of expansion and a metering portion extending into said orifice, said stem portion being formed with a transverse groove on one side of the axis thereof, providing axially spaced radial walls, an insert element in said groove engaging said radial walls formed of a material having a coefficient of expansion smaller than the coefficient of expansion of said stem whereby said metering portion approaches concentricity with said orifice as the fluid reaches a predetermined temperature and moves away from said concentric position as said temperature decreases, and stop means limiting lateral motion of said metering portion in one direction when said orifice and metering portion are concentric.

References Cited in the file of this patent

UNITED STATES PATENTS

| | | |
|---|---|---|
| 1,922,266 | Toman | Aug. 15, 1933 |
| 2,582,324 | Gailloud | Jan. 15, 1952 |